(12) United States Patent
Torres Esteban et al.

(10) Patent No.: US 11,577,816 B2
(45) Date of Patent: Feb. 14, 2023

(54) COMPOSITE LAMINATE FOR AN AIRFRAME LIFTING SURFACE AND METHOD FOR MANUFACTURING THEREOF

(71) Applicant: AIRBUS OPERATIONS SL, Madrid (ES)

(72) Inventors: Antonio Torres Esteban, Madrid (ES); Jose-Maria Blanco-Saiz, Madrid (ES); Manuel Recio Melero, Madrid (ES); Pedro Nogueroles Viñes, Esquivias (ES)

(73) Assignee: AIRBUS OPERATIONS SL, Madrid (ES)

( * ) Notice: Subject to any disclaimer, the term of this patent is extended or adjusted under 35 U.S.C. 154(b) by 43 days.

(21) Appl. No.: 17/364,195

(22) Filed: Jun. 30, 2021

(65) Prior Publication Data

US 2021/0403137 A1 Dec. 30, 2021

(51) Int. Cl.
*B64C 3/26* (2006.01)
*B64F 5/10* (2017.01)
(Continued)

(52) U.S. Cl.
CPC ............... *B64C 3/26* (2013.01); *B29C 70/30* (2013.01); *B64C 1/061* (2013.01); *B64C 5/02* (2013.01); *B64C 7/00* (2013.01); *B64C 9/00* (2013.01); *B64F 5/10* (2017.01); *B29K 2105/0872* (2013.01); *B29L 2031/3085* (2013.01); *B64C 2001/0072* (2013.01); *B64C 2009/005* (2013.01)

(58) Field of Classification Search
CPC ............ B64C 3/26; B64C 1/061; B23C 70/30
See application file for complete search history.

(56) References Cited

U.S. PATENT DOCUMENTS 3,768,760 A * 10/1973 Jensen ...................... B64C 3/26
428/105
7,115,323 B2 * 10/2006 Westre ................... B32B 15/08
428/189
(Continued)

OTHER PUBLICATIONS

Extended European Search Report for EP Application No. 20382583.1 dated Mar. 10, 2021, 13 pages.
(Continued)

*Primary Examiner* — Michael H Wang
(74) *Attorney, Agent, or Firm* — Nixon & Vanderhye P.C.

(57) ABSTRACT

A composite laminate for an airframe lifting surface including: at least two sides and one ramp area defined by a decreasing staggered laminate extended along a ramp direction, wherein the composite laminate includes: first plies formed by tapes arranged parallel to the ramp direction, second plies formed by tapes arranged orthogonal to the ramp direction, third plies formed by tapes arranged in a first laying up direction, being the first laying up direction different from the ramp direction and the direction orthogonal to the ramp direction, and fourth plies formed by tapes arranged in a second laying up direction, being the second laying up direction different from the ramp direction, the direction orthogonal to the ramp direction and the first laying up direction; wherein in the ramp area, the tapes forming the third and/or fourth plies are extended from one laminate side to another laminate side.

16 Claims, 5 Drawing Sheets

(51) Int. Cl.
  *B29C 70/30* (2006.01)
  *B64C 1/06* (2006.01)
  *B64C 5/02* (2006.01)
  *B64C 7/00* (2006.01)
  *B64C 9/00* (2006.01)
  B29K 105/08 (2006.01)
  B29L 31/30 (2006.01)
  B64C 1/00 (2006.01)

(56) References Cited

U.S. PATENT DOCUMENTS

| | | | |
|---|---|---|---|
| 11,247,413 B2* | 2/2022 | Rotter | B29C 70/38 |
| 2004/0026025 A1* | 2/2004 | Sana | B29C 70/545 |
| | | | 156/523 |
| 2004/0213952 A1* | 10/2004 | Takemura | B32B 5/12 |
| | | | 428/113 |
| 2006/0222837 A1* | 10/2006 | Kismarton | B29C 70/226 |
| | | | 428/297.4 |
| 2009/0148647 A1* | 6/2009 | Jones | B29C 70/38 |
| | | | 156/159 |
| 2010/0133039 A1* | 6/2010 | Liguore | B29C 70/202 |
| | | | 156/308.2 |
| 2017/0368766 A1* | 12/2017 | Brennan | B29C 70/32 |
| 2019/0016064 A1* | 1/2019 | Todorovic | B29C 70/24 |

OTHER PUBLICATIONS

Zhang Ting et al., "Effect of Ply-Drops With Gaps In Tapered Laminate", Composites Communications 18 (2020), pp. 26-31.

* cited by examiner

COMPOSITE LAMINATE FOR AN AIRFRAME LIFTING SURFACE AND METHOD FOR MANUFACTURING THEREOF

RELATED APPLICATION

This application incorporates by reference European patent application 20382583-1, filed Jun. 30, 2020, the entirety of which is incorporated by reference.

TECHNICAL FIELD

The present invention is in the field of composite laminates used in aeronautical structures, and particularly, composite laminates that include a ramp. The invention may be embodied to provide a composite laminate with a ramp for an airframe lifting surface, and a method for its manufacture.

The present invention may be applied to provide an improved laminate for an airframe lifting surface. The invention is suitable to be made by high deposition pre-impregnated (HD preg) material formats with better results than the state of the art laminates when used as interface with other aircraft parts or components.

BACKGROUND

As shown in FIG. 1, a composite airframe lifting surface (1) typically includes a composite laminate (2) skin stiffened by stringers (8). The composite airframe lifting surface (1) may be embodied as a torsion box, a horizontal tail plane, a vertical tail plane, a rudder, an elevator, an aileron, a spoiler, and a flap.

These composite airframe lifting surfaces are conventionally manufactured with standard pre-preg materials by means of 'Automated Fiber Placement' (AFP) or 'Automated Tape Laying' (ATL) technologies. Both ATL and AFP processes are functionally similar. They involve applying resin-impregnated fiber material (so called 'prepreg').

ATL and AFP may be used differently to achieve specific structure construction goals to provide strength or stiffness where needed. The use of one or the other mainly depends on the geometry complexity of the part to manufacture. AFP allows higher curvatures in parts than does ATL. In both methods, the lay-up processes require many labor hours, even though some steps of the process have been automated. To achieve a high production rate of products produced by ATL or AFP processes a big investment is needed in terms of machines and shop floor to compensate for the large lead time needed to perform the manually intensive lay-up processes.

High deposition pre-preg material formats are known in the aeronautical field to those formats and technology able to substantially reduce the lay-up time needed to obtain these composite structures. These high deposition pre-preg materials are pre-impregnated composite fibers materials where a thermoset polymer matrix material or a thermoplastic resin is already present. The technology design of these material formats allow a quick lay up of tapes (tows) of pre-preg material because they are provided in a wide format, e.g., tows wider than 1.5 inches (3.81 cm), which is wider than conventional standard pre-preg material formats. These wide format tows may also be thicker than conventional standard pre-preg material formats.

High deposition pre-preg technology are not considered suitable for the manufacture of the current composite airframe lifting surfaces due to the irregularities and loss of quality that appear in the composite laminate of the lifting surfaces once they are cured.

The irregularities include an undesired saw teeth effect on the ramp portions of the composite airframe lifting surfaces. The saw teeth effect occurs at the ends of the tapes forming each ply of the laminated ramp. The saw teeth effect results from the tapes not being at an angle to the ramp direction, e.g., not parallel or perpendicular to the ramp direction. The ends of the tapes leave form triangles forming a "saw teeth" pattern as shown in FIG. 2. The direction of the ramp is the direction of decrease of the lifting surface thickness along the ramp portion of the composite laminate.

The saw teeth effect in the ramp produces deviations on the obtained composite airframe lifting surfaces from with the theoretical lifting surfaces. When the airframe lifting surfaces are manufactured with current material formats, the saw teeth effect is minimal. The saw teeth effect worsens (in depth and size of the teeth) when the composite airframe lifting surface is manufactured with high deposition pre-preg formats due to the wide tapes and possibly thick tapes.

The saw teeth effect reduces the quality of the surface of the composite material resulting from high deposition pre-preg. The reduce quality of the surface may affect the interface between a lifting surface formed by a high deposition pre-preg format and other parts or components. FIG. 3 shows an example of the irregular surfaces resulting from the saw teeth effect, where section AA creates a peak, and section BB creates a valley.

The interfaces between components or parts may be co-cured, co-bonded or fastened. The irregular surface at the interface may derive in compaction issues (porosity and wrinkles) in a co-cured process; irregular adhesive thickness distribution in a co-bonded process (bonding issues); and irregular gaps to be shimmed in a fastened interface with huge lead time and labor increase.

SUMMARY OF THE INVENTION

The present invention provides a solution for the above saw teeth effect in a composite laminate for an airframe lifting surface, and a method for manufacturing a composite laminate for an airframe lifting surface that produces a composite with a ramp unaffected by the saw teeth effect. The composite laminate may be formed of a high deposition pre-preg (HD-preg) material formats and have high quality surfaces along a ramp.

The invention may be embodied as a composite laminate for an airframe lifting surface, the composite laminate being made of a pre-preg material, and comprising at least two sides and one ramp area defined by a decreasing staggered laminate extended along a ramp direction. The composite laminate comprises a combination of:

first plies formed by tapes arranged parallel to the ramp direction, second plies formed by tapes arranged orthogonal to the ramp direction, third plies formed by tapes arranged in a first laying up direction, being the first laying up direction different from the ramp direction and the direction orthogonal to the ramp direction, and fourth plies formed by tapes arranged in a second laying up direction, being the second laying up direction different from the ramp direction, the direction orthogonal to the ramp direction and the first laying up direction; and wherein in the ramp area, the tapes forming the third and/or fourth plies are extended from one laminate side to another laminate side.

The composite laminate are a set of stacked plies manufactured with composite materials. Each py is formed by tapes laid-up following one and the same laying up direction. The tapes forming the plies may be high deposition pre-preg materials. The lay-up of these materials may be performed by AFP.

A ply is a single continuous layer of composite material formed by a plurality of tapes laid up (arranged) to follow the same direction. The successive lay-up of the plies forms a stack or a set of stacked plies. A stack or set of stacked plies become a composite laminate.

The composite laminate may comprise at least one ramp area on one of its ends. A ramp area corresponds to a decreasing staggered laminate along a ramp direction. A ramp direction D is a direction extended along to the decreasing staggered laminate, that is, a direction defined from a free ramp laminate portion of the laminate to the end of the ramp area of said laminate.

The composite laminate may have a different lay out configuration in the ramp area with respect to the rest of the laminate (no-ramp area or free-ramp area).

The specific lay out configuration in the ramp area is determined by the tapes of the third and/or the fourth plies: Particularly, the tapes forming the third and/or the fourth plies are extended from one laminate side to another laminate side. The another laminate side may be an opposite laminate side.

The present invention may be embodied as a laminate design free from the saw teeth effect in the ramp area. Thus, the laminate of the invention is compatible with high deposition pre-preg material formats. By eliminating or reducing the saw teeth effect, the invention may provide an increase of quality in the skin ramps. In particular, the invention may provide a good quality surface that facilitates joints between a composite laminate and other components by means of the co-cured, co-bonded or fastening joint. In addition, the laminate design ensures the required tolerances at the bolted interface areas with other components.

In addition, the composite laminate manufactured with high deposition pre-preg materials provides cost and lead time reduction, since a high production rate may be used.

In a particular embodiment, the tapes of each ply have a width greater than 3.81 cm (1.5 inch) to assist in conforming a laminate with high deposition pre-preg materials.

SUMMARY OF DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 3 shows an irregular surface of a state of the art laminate, wherein FIG. 3 shows two views of the irregular surface.

FIG. 4A shows a detailed view of FIG. 4 to illustrate the plies in the composite laminate shown in FIG. 4.

FIG. 5A shows a detailed view of FIG. 5 to illustrate the plies in the composite laminate shown in FIG. 5.

DETAILED DESCRIPTION OF THE INVENTION

The present invention is applicable to a composite laminate having a ramp, such as a composite laminate forming an aircraft airframe lifting surface. The composite laminate may be manufactured with pre-preg material formats without compromising ramp surface quality.

Figure 1:
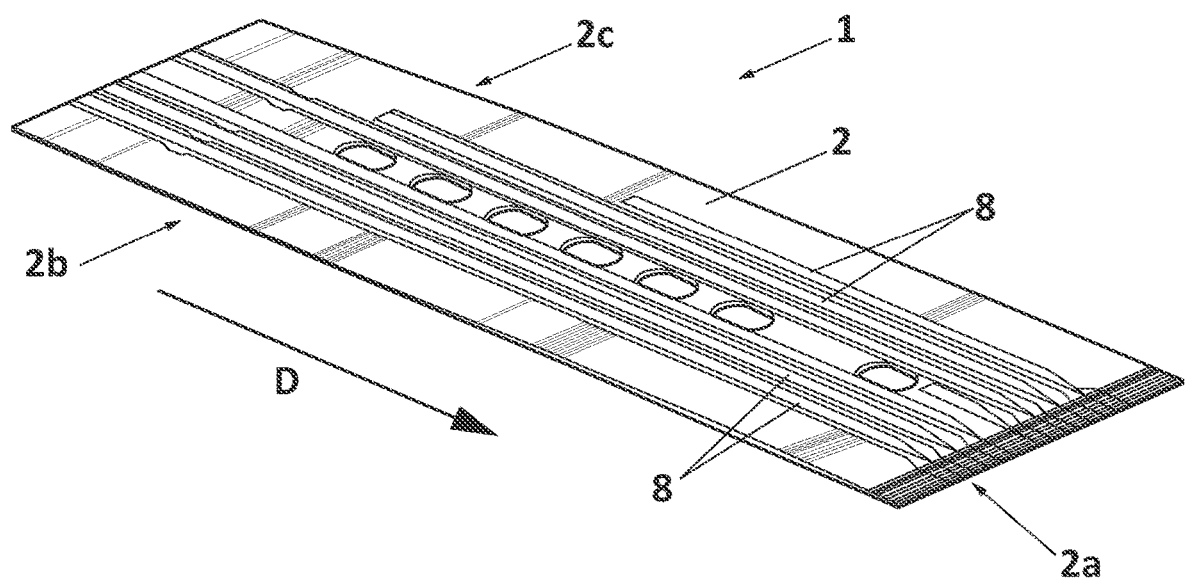
FIG. 1 shows a perspective view of an airframe lifting surface.
Figure 2:
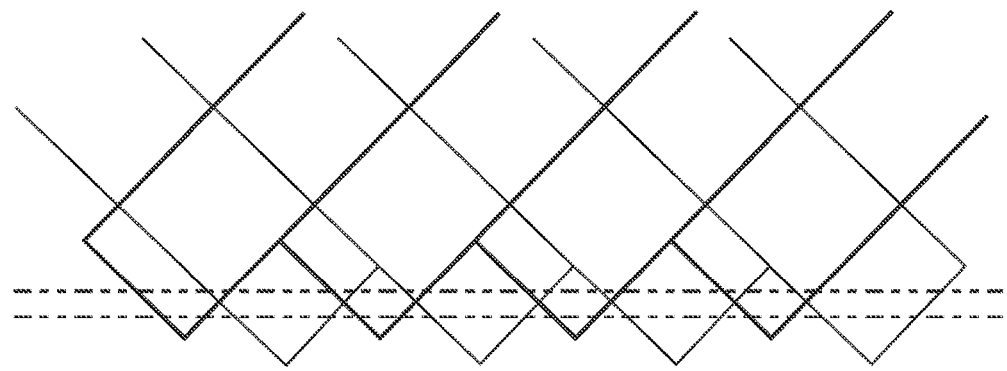
FIG. 2 illustrates a saw teeth pattern on a state of the art laminate.
Figure 3:
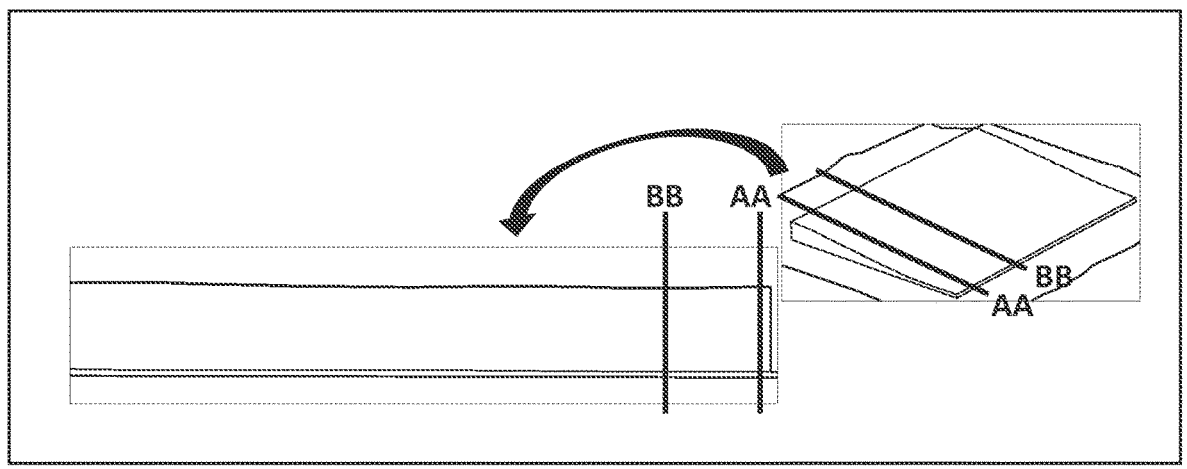

FIG. 1 shows a perspective view of an airframe lifting surface (1) that comprises a composite laminate (2) composed by a set of stacked plies of pre-preg material.

The composite laminate (2) comprises a ramp area (2a) with a decreasing staggered laminate. This ramp area (2a) is extended parallel to a ramp direction D corresponding with the direction of the decreasing staggered laminate.

This composite laminate (2) has an elongate configuration, comprising the ramp area (2a) between its two longest opposite sides (2b, 2c).

Figure 4:
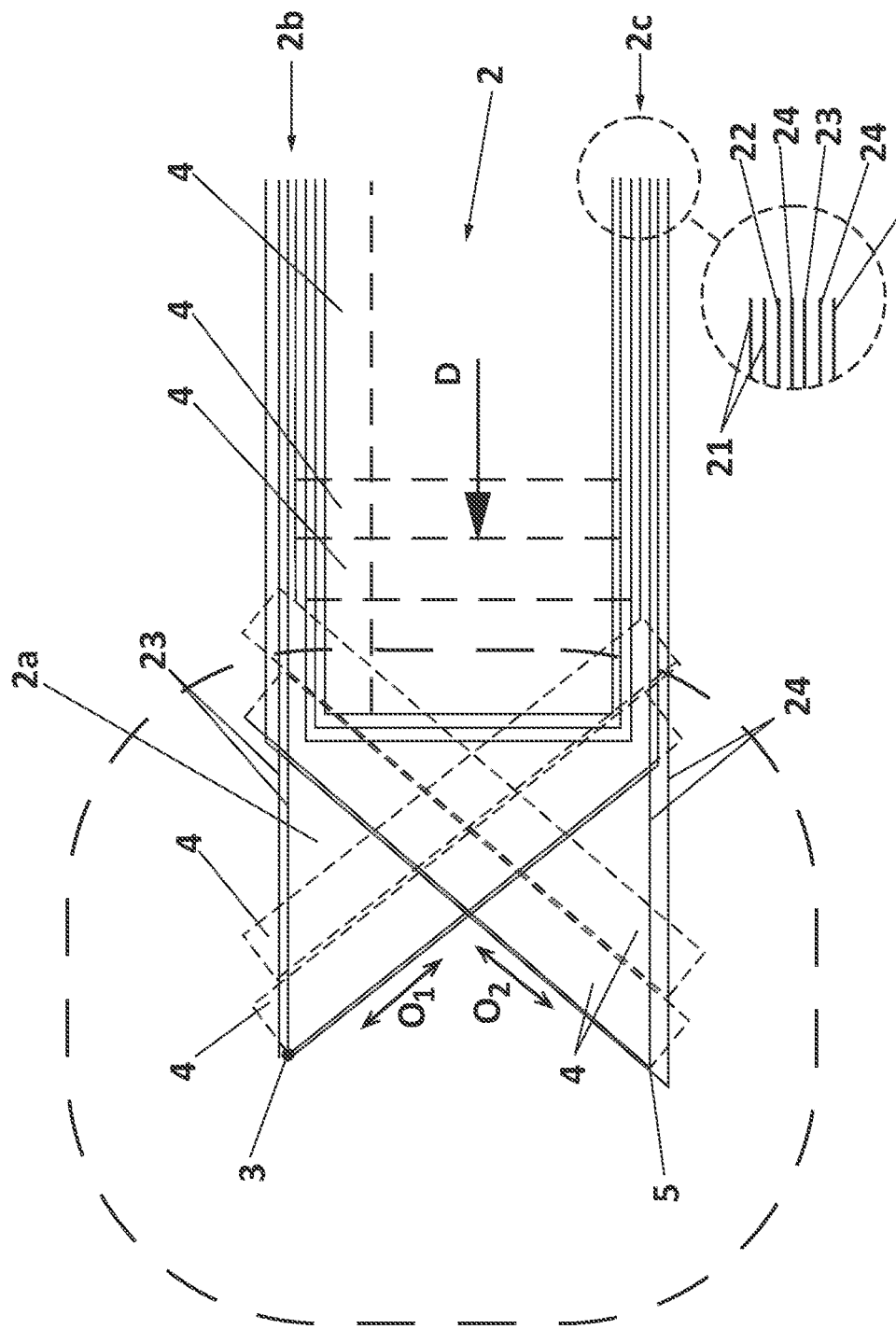
FIG. 4 shows a schematic representation of a first embodiment of a composite laminate according to the present invention.
Figure 5:
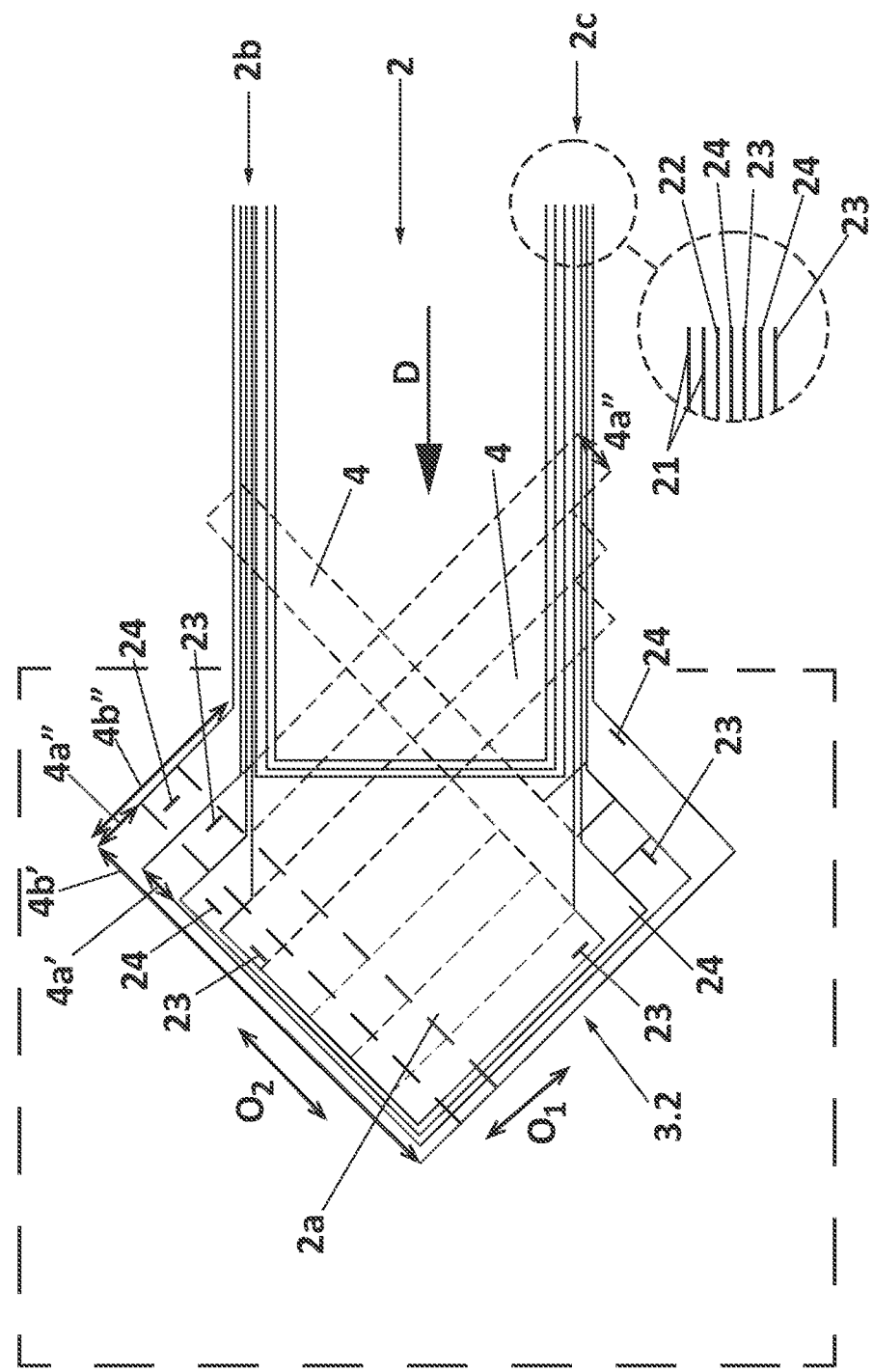
FIG. 5 shows a schematic representation of a second embodiment of a composite laminate according to the present invention.

This composite laminate (2) is configured with any of the combination of plies shown in FIGS. 4 and 5.

The airframe lifting surface (1) shown in FIG. 1 further comprises a plurality of stiffening elements (8) located along an upper surface of the laminate (2) and bonded to the surface of the composite laminate. The stiffening elements (8) may be stringers. The stiffening elements (8) may be co-cured with a fresh set of stacked plies of the composite laminate (2). In another example, the stiffening elements (8) are co-bonded with the cured composite laminate (2).

FIGS. 4 and 5 show different embodiments of a composite laminate (2) embodying the invention.

The laminate (2) may comprise the following combination of plies:

first plies (21) formed by tapes (4) arranged parallel to the ramp direction (D), second plies (22) formed by tapes (4) arranged orthogonal to the ramp direction (D), third plies (23) formed by tapes (4) arranged in a first laying up direction (O1), being the first laying up direction (O1) different from the ramp direction (D) and the direction orthogonal to the ramp direction (D), and fourth plies (24) formed by tapes (4) arranged in a second laying up direction (O2), being the second laying up direction (O2) different from the ramp direction (D), the direction orthogonal to the ramp direction (D) and the first laying up direction (O1).

while, in the ramp area (2a), the tapes (4) forming the third (23) and/or fourth (24) plies are extended from one laminate side (2b) to the opposite laminate side (2c).

The above combination of plies is shown in detail in FIGS. 4A and 5A according to the embodiments of FIGS. 4 and 5 respectively.

FIG. 4 shows a first embodiment of a composite laminate (2) with a particular lay out configuration in the ramp area (2a), since in such ramp area (2a), the tapes (4) forming the third (23) and the fourth (24) plies are extended from one laminate side (2b) to the opposite laminate side (2c), crossing over both laminate sides (2b, 2c).

FIG. 5 shows a second embodiment of a composite laminate (2) with another particular lay out configuration in the ramp area (3), since in such ramp area (2a), the outermost shortest side of the tapes (4a') forming the third plies (23) are extended up to the outermost longest side of the tapes (4b') forming the fourth plies (24). Similarly, the outermost shortest side of the tapes (4a") forming the fourth plies (24) are extended up to the outermost longest side of the tapes (4b") forming the third plies (23).

As seen in the embodiments shown in FIGS. 4 and 5, the composite laminate (2) avoids the saw teeth effect in the ramp area (2a), by shifting it to the sides of the laminate (2b, 2c). By avoiding the saw teeth effect in the ramp area, an even surface suitable to be an interface with other components or parts that are to be co-cured, co-bonded or fastened together. Specifically, this surface evenness avoids porosity and wrinkles in co-cured processes, bonding issues in co-bonded processes, and irregular gaps in a fasten processes.

Both configurations may allow for variants with respect to the first (21) and second (22) plies. According to one variant, the ramp area (2a) are formed by of third (23) and fourth plies (24) and lack first (21) and second (22) plies in the ramp area (2a), since these plies are laid-up up to the beginning of the ramp area (2a). According to another variant, the ramp area (2a) comprises first (21) and/or second (22) plies extended up to the outermost extreme (3, 5) of the third (23) and/or fourth plies (24) that form(s) said ramp area (2a). According to a further variant, the ramp area (2a) comprises first (21) and/or second (22) plies extended beyond the outermost extreme (3, 5) of the third (23) and/or fourth plies (24) that form(s) said ramp area (2a).

FIGS. 4 and 5, show the tapes (4) of the first plies (21) as laid up in a direction of zero degrees (0°) with respect to the direction of the longest dimension of the laminate (2), which is coincident with the ramp direction D. The second plies (22) are laid up in a direction of ±90° with respect to the direction of the longest dimension of the laminate (2). The tapes (4) of the third plies (23) are laid up in a first laying up direction (O1) of +45° with respect to the direction of the longest dimension of the laminate (2). The tapes (4) of the fourth plies (24) are laid up in a second laying up direction (O2) of −45° with respect to the direction of the longest dimension of the laminate (2).

In another embodiment, the first (21) and the second (22) plies are laid up forming a stack of overlapping edges in the ramp area (2a). The edges of the plies forming the stack are coincident with the sides of the laminate (2b, 2c).

In another embodiment, the tapes of each ply have a width greater than 3.81 cm (1.5 inch), and are suited for a high deposition pre-preg laminate.

The present invention may be embodied as a method for manufacturing a composite laminate (2) for an airframe lifting surface (1), the method comprising the steps of:
laying up pre-preg material to form a set of stacked plies comprising at least a ramp area (2a) defined by decreasing staggered plies extended along a ramp direction (D),
curing the set of stack plies,
obtaining a composite laminate (2) for an airframe lifting surface (1) in the form of a cured composite laminate (2);
wherein the stacked plies laid up in the laying up step includes:
first plies (21) formed by tapes (4) arranged parallel to the ramp direction (D),
second plies (22) formed by tapes (4) arranged orthogonal to the ramp direction (D),
third plies (23) formed by tapes (4) arranged in a first laying up direction (O1), being the first laying up direction (O1) different from the ramp direction (D) and the direction orthogonal to the ramp direction (D), and
fourth plies (24) formed by tapes (4) arranged in a second laying up direction (O2), being the second laying up direction (O2) different from the ramp direction (D), the direction orthogonal to the ramp direction (D) and the first laying up direction (O1); and,
in the ramp area (2a), laying up the tapes (4) forming the third (23) and/or fourth (24) plies from one laminate side (2b) to the another laminate side (2c).

According to another embodiment, the laying up of step a) is performed according to one of the following:
laying up first (21) and second (22) plies up to the ramp area (2a),
laying up first (21) and/or second (22) plies up to the outermost extreme (3, 5) of the third (23) and/or fourth plies (24) deployed on said ramp area (2a),
laying up first (21) and/or second (22) plies beyond the outermost extreme (3, 5) of the third (23) and/or fourth plies (24) deployed on said ramp area (2a).

Step a) may comprise, in the ramp area (2a), laying up the tapes (4) forming the third (23) and fourth (24) plies from one laminate side (2b) to the opposite laminate side (2c), crossing over both laminate sides (2b, 2c). This preferred embodiment leads to the composite laminate shown in FIGS. 4 and 4A.

Step a) may also comprise, in the ramp area (2a), laying up the outermost shortest side of the tapes (4a') forming the third plies (23) up to the outermost longest side of the tapes (4b') forming the fourth plies (24), and laying up the outermost shortest side of the tapes (4a") forming the fourth plies (24) up to the outermost longest side of the tapes (4b") forming the third plies (23).

The inventive method may form composite laminate shown in FIGS. 5 and 5A.

In a particular example for obtaining the laminates shown in FIGS. 4 and 5, the lay up would be following the subsequent order:
a third ply (23) formed by tapes (4) arranged in the first laying up direction (O1) of +45°,
a fourth ply (24) formed by tapes (4) arranged in the second laying up direction (O2) of −45°,
a third ply (23) formed by tapes (4) arranged in the first laying up direction (O1) of +45°,
a fourth ply (24) formed by tapes (4) arranged in the second laying up direction (O2) of −45°,
a second ply (22) formed by tapes (4) arranged in a third laying up direction of ±90° with respect to the ramp direction (D), and
two first ply (21) formed by tapes (4) arranged parallel to the ramp direction (D).

An inventive method is disclosed for manufacturing an airframe lifting surface (1) comprising the following steps:
providing at least a composite laminate (2) obtained in at least one of the steps of the method previously defined,
providing stiffening elements (8),
joining the stiffening elements (8) to the composite laminate (2), and
obtaining the airframe lifting surface (1).

In a particular example, the cured composite laminate (2), obtained in the step c) of the method previously defined for manufacturing a composite laminate (2), is joined to at least one stiffening element (8) by a co-bonding process wherein the stiffening element (8) is bonded to the composite laminate (2) by means of an adhesive line. This is performed on the step iii) of the method for manufacturing an airframe lifting surface (1).

The set of stacked plies in the form of a fresh composite laminate (a 'preform'), obtained in the step a) of the method previously defined for manufacturing a composite laminate (2), may be joined to at least one stiffening element (8), and both components are cured together in a same curing cycle by means of a co-curing process.

Figure 6:
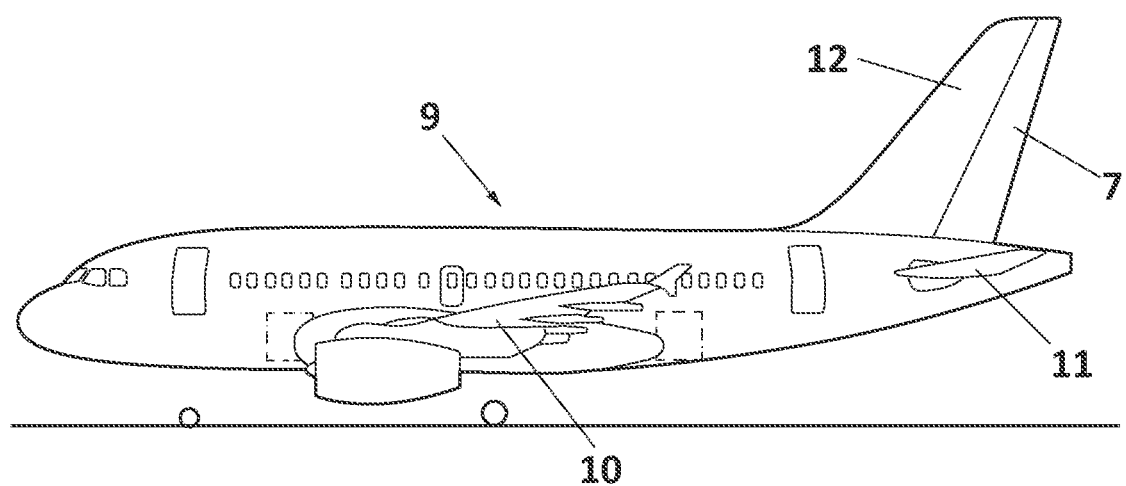
FIG. 6 shows an aircraft including a composite laminate according to an embodiment of the present invention.

FIG. 6 shows an aircraft (9) comprising a plurality of airframe lifting surfaces (1), such as a wing torsion box (10), a horizontal tail plane (11), a vertical tail plane (12), and a rudder (7). These airframe lifting surfaces (1) are manufactured from a composite laminate (2) according to the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A composite laminate for an airframe lifting surface, the composite laminate is formed by a pre-preg material and comprises:
   at least two sides and one ramp area defined by a decreasing staggered laminate extended along a ramp direction,
   wherein the composite laminate includes:
      first plies formed by tapes aligned with the ramp direction,
      second plies formed by tapes oriented orthogonal to the ramp direction,
      third plies formed by tapes arranged in a first laying up direction, wherein the first laying up direction differs from the ramp direction and differs from the orthogonal to the ramp direction, and
      fourth plies formed by tapes arranged in a second laying up direction, wherein the second laying up direction differs from the ramp direction, the orthogonal to the ramp direction, and the first laying up direction;
   wherein in the ramp area, the tapes forming the third and/or fourth plies extend from one laminate side to another laminate side.

2. The composite laminate according to claim 1, wherein the ramp area includes a region formed by the third plies and the fourth plies, and lacks the first plies and the second plies.

3. The composite laminate according to claim 1, wherein in the ramp area the first plies and/or the second plies extend at least to portions of the third plies and/or the fourth plies.

4. The composite laminate according to claim 1, wherein in the ramp area the first plies and/or second plies overlap portions of the third plies and/or third plies.

5. The composite laminate according to claim 1, wherein the first plies and the second plies are laid up to form a stack of overlapping edges in the ramp area.

6. The composite laminate according to claim 5, wherein the edges of the plies forming the stack are coincident with sides of the composite laminate.

7. The composite laminate according to claim 1, wherein in the ramp area, the tapes forming the third and fourth plies extend from a first laminate side to a second laminate side, opposite to the first laminate side, and the tapes cross over the first and second laminate sides.

8. The composite laminate according to claim 1, wherein in the ramp area,
   an outermost shortest side of the tapes forming the third plies are extended to an outermost longest side of the tapes forming the fourth plies, and
   an outermost shortest side of the tapes forming the fourth plies are extended to an outermost longest side of the tapes forming the third plies.

9. The composite laminate according to claim 1, wherein the first laying up direction is orthogonal to the second laying up direction.

10. The composite laminate according to claim 9, wherein the first laying up direction is +45° with respect to a longest direction of the laminate, and the second laying up direction is −45° with respect to the longest direction of the laminate.

11. The composite laminate according to claim 1, wherein the ramp direction is aligned with a direction defined by a longest dimension of the laminate.

12. An airframe lifting surface comprising a composite laminate according to claim 1, and including at least one of: a torsion box, a horizontal tail plane, a vertical tail plane, a rudder, an elevator, an aileron, a spoiler and a flap.

13. A method for manufacturing a composite laminate for an airframe lifting surface comprising:
   a) laying up pre-preg material forming a set of stacked plies comprising at least a ramp area defined by decreasing staggered plies extended along a ramp direction,
   b) curing the set of stack plies obtained in the step a),
   c) obtaining a composite laminate for an airframe lifting surface in the form of a cured composite laminate;
   wherein the step a) comprises laying up:
      first plies formed by tapes arranged parallel to the ramp direction,
      second plies formed by tapes arranged in a direction orthogonal to the ramp direction,
      third plies formed by tapes arranged in a first laying up direction, wherein the first laying up direction differs from the ramp direction and the direction orthogonal to the ramp direction, and
      fourth plies formed by tapes arranged in a second laying up direction, wherein the second laying up direction differs from the ramp direction, the direction orthogonal to the ramp direction and the first laying up direction; and,
      in the ramp area, laying up the tapes forming the third plies and/or the fourth plies from a first laminate side to a second laminate side opposite to the first side.

14. The method, according to claim 13, wherein the laying up of step a) comprises one of the following:
   laying up the first plies and the second plies up to the ramp area,
   laying up the first plies and/or the second plies up to an outermost extreme of the of the third plies and/or the fourth plies deployed on the ramp area,
   laying up the first plies and/or the second plies beyond the outermost extreme of the third plies and/or the fourth plies deployed on said ramp area.

15. The method, according to claim 13, wherein the step a) comprises, in the ramp area, laying up the tapes forming the third plies and the fourth plies from the first laminate side to the second laminate side, and crossing over the first and second laminate sides.

16. The method, according to claim 13, wherein the step a) comprises, in the ramp area,
- laying up the outermost shortest side of the tapes forming the third plies up to the outermost longest side of the tapes forming the fourth plies, and
- laying up the outermost shortest side of the tapes forming the fourth plies up to the outermost longest side of the tapes forming the third plies.

* * * * *